US006369463B1

United States Patent
Maiorano

(10) Patent No.: US 6,369,463 B1
(45) Date of Patent: *Apr. 9, 2002

(54) APPARATUS AND METHOD FOR SUPPLYING ALTERNATIVE ENERGY AND BACK-UP EMERGENCY POWER TO ELECTRICAL DEVICES

(75) Inventor: Thomas Maiorano, Brewster, NY (US)

(73) Assignee: Alternate Energy Concepts, Inc., Brewster, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/483,262

(22) Filed: Jan. 13, 2000

(51) Int. Cl.[7] .................................................. H02J 7/00

(52) U.S. Cl. ........................................................ 307/66

(58) Field of Search ............................ 307/64, 66, 87; 320/132

(56) References Cited

U.S. PATENT DOCUMENTS

| 4,672,520 | A | * | 6/1987 | Ueda et al. ................... 307/66 |
| 4,673,826 | A | * | 6/1987 | Masson ....................... 307/66 |
| 4,709,318 | A | * | 11/1987 | Gephart et al. ............... 307/66 |
| 5,076,763 | A | * | 12/1991 | Anastos et al. ............. 417/44.11 |
| 5,234,319 | A | * | 8/1993 | Wilder ........................ 417/40 |
| 5,616,968 | A | * | 4/1997 | Fujii et al. .................... 307/66 |
| 6,188,200 | B1 | * | 2/2001 | Maiorano .................... 320/132 |

* cited by examiner

Primary Examiner—Peter S. Wong
Assistant Examiner—Pia Tibbits
(74) Attorney, Agent, or Firm—Cooper & Dunham LLP

(57) ABSTRACT

An apparatus and method for supplying alternating current power to electrical devices wherein a subpanel having a plurality of switches allows a user to preset selected electrical devices for either automatic or manual load pick up by a battery during a utility power loss. Battery power is supplied only to predetermined electrical devices so as to avoid overload of the battery.

19 Claims, 4 Drawing Sheets

APPARATUS AND METHOD FOR SUPPLYING ALTERNATIVE ENERGY AND BACK-UP EMERGENCY POWER TO ELECTRICAL DEVICES

FIELD OF THE INVENTION

This invention relates to an apparatus and method for supplying alternating current power to electrical devices, and more particularly, to an apparatus and method which allows for setting predetermined electrical devices for either an automatic or manual change from electric utility power to battery power during a power outage.

BACKGROUND OF THE INVENTION

Various types of backup power supply systems are known which provide backup battery power to sump pumps, refrigerators, computers, heating equipment and other types of electric devices.

These devices do not provide the capability to select specific electrical devices for either an immediate or manual switch to battery power in the event of a power outage. In other words, the known devices cannot be set to supply power only to selected electrical devices so as to avoid overload of the battery.

An additional disadvantage of some of the known devices is that they are not connectable to power generating devices which can prevent battery burn out by charging the battery during a loss of main power.

Further, a disadvantage of known 12 volt auxiliary power systems is that a high current is needed to supply a substantial amount of power to the electrical devices. A high current flow through battery cables causes energy loss and, as a result, these 12 volt systems do not make the most efficient use of the stored battery power.

SUMMARY OF THE INVENTION

It is therefore an object of the present invention to provide an apparatus and method for supplying alternating current power to electrical devices such as sump pumps, refrigerators, computers, heating equipment and the like, which will, in the event of a power outage, automatically switch only predetermined electrical devices to battery power, with the remaining electrical devices switching to battery power only upon manual operation by a user.

It is an additional object of the present invention to provide a method and apparatus for supplying alternating current power to electrical devices wherein the battery is charged by a backup power generating device during a loss of main power.

The foregoing objects are achieved and the disadvantages of the known power supply devices are overcome by providing an apparatus which supplies alternating current power to electrical devices from an electric utility power supply or, when the utility power supply is not available, from a battery. The apparatus includes an inverter connected to the battery at a direct current input portion of the inverter. The inverter changes direct current power to alternating current power and outputs the alternating current power at its output portion.

The apparatus also includes a conversion relay connected to the utility power supply and the output portion of the inverter. The conversion relay supplies power from either the utility power supply or the battery via the inverter to the electrical devices connected to a final output portion. The final output portion includes a plurality of AC receptacles to receive plugs from electrical devices.

A charging system, such as a pulsed charging system, is connected to the utility power supply via the conversion relay and to the battery so as to enable charging of the battery with power from the utility power supply. At least one charge controller can be connected to the charging system and to a power generating device, such as a wind turbine, a solar array or the like, to charge the battery with power supplied from the power generating device.

The device includes a power converter, such as a twin inversion power unit, a triple (for 3-phase systems) inversion power unit, or a step-up transformer, that connects to a subpanel. The step-up transformer increases an input voltage from 110 volts to 220 volts to accommodate the electric devices with higher voltage requirements, such as well-pumps or the like. An inversion power unit may be used in place of a step-up transformer when, for example, the input voltage is already 220 volts.

The subpanel consists of a plurality of switches which correspond to predetermined electrical devices connected to the apparatus. Some of the subpanel switches are set in the "on" position to effectuate automatic load pick up by the battery in the event of power outage. Therefore, when the utility power supply is unavailable, the electrical devices which correspond to the switches set in the "on" position are supplied with power from the battery.

The electrical devices corresponding to the subpanel switches set to the "off" position will not receive power during a power outage unless the switches are turned to the "on" position. Limiting the power supply to the devices corresponding to the activated switches prevents overload of the battery, as well as providing a means by which reserve capacity of the system may be maintained.

A device which filters incoming power and protects electronic equipment from damage due to distorted utility voltage caused by an energy crisis situation, such as a line conditioner, can be connected to the power converter and between the inverter and final output portion. A line conditioner may be necessary when one of the electrical devices is, for example, a computer. Additionally, the device can include a fan positioned therein to maintain a cool temperature.

In order to ensure an adequate supply of battery power during a power outage, a battery may be linked to a second cell bank. In addition, to further charge the battery, any number of charge controllers included the apparatus can be connected to the power generating devices described above.

A method for supplying alternating current power to the electrical devices from the electric utility power supply or from a battery when the utility power supply is unavailable, includes the steps of connecting the inverter to the battery at the direct current input portion of the inverter; changing direct current power to alternating current power; outputting the alternating current power at the output portion of the inverter; connecting a conversion relay to the utility power supply and to the output portion of the inverter; supplying power from either the utility power supply or the battery via the inverter to electrical devices connected at the final output portion of the apparatus; connecting the charging system to the utility power supply via the conversion relay and to the battery source; charging the battery source with power from the utility power supply; connecting the power converter to the subpanel having the plurality of switches; assigning each one of the switches to an electrical device; setting a first group of the switches to the "on" position to cause automatic load pick up by the battery when the utility power supply is unavailable; and setting a second group of the switches to the "off" position to cause manual load pick up by the battery when the utility power supply is unavailable.

The method may also include the steps of connecting at least one charge controller to the charging system and a power generating device; and charging the battery with power supplied from the power generating device.

BRIEF DESCRIPTION OF THE DRAWINGS

The features and advantages of the invention will become apparent upon review of the following detailed description of the preferred embodiment, taken in conjunction with the following drawings, in which.

DETAILED DESCRIPTION

The present invention relates to an apparatus and method for supplying alternating current power to electrical devices from a utility power supply or, in the event of a utility power loss, from a battery, wherein the switch to battery power occurs automatically and without any downtime for predetermined electrical devices.

Figure 1:
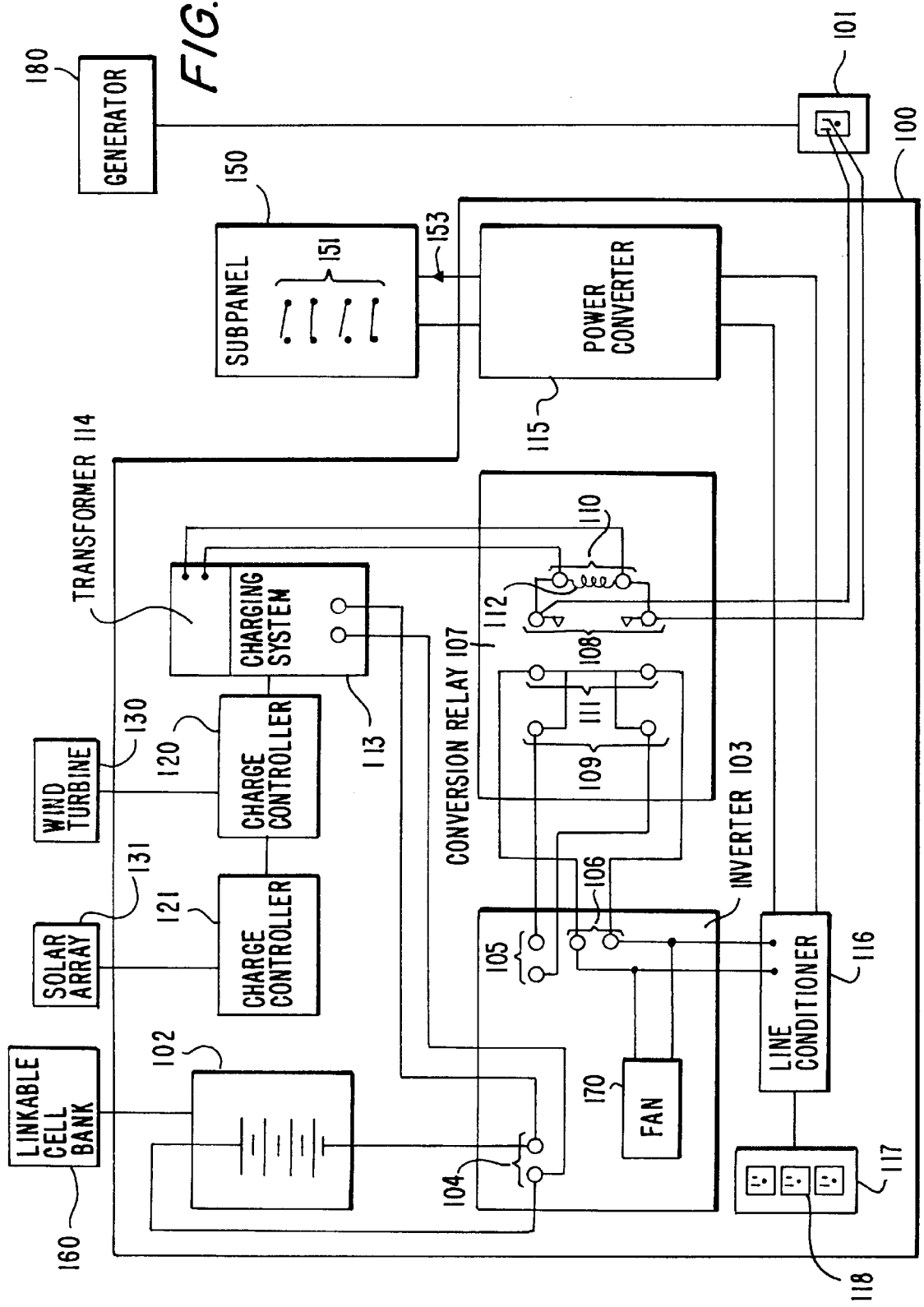
FIG. 1 is schematic diagram of an embodiment of the present invention.
Figure 2:
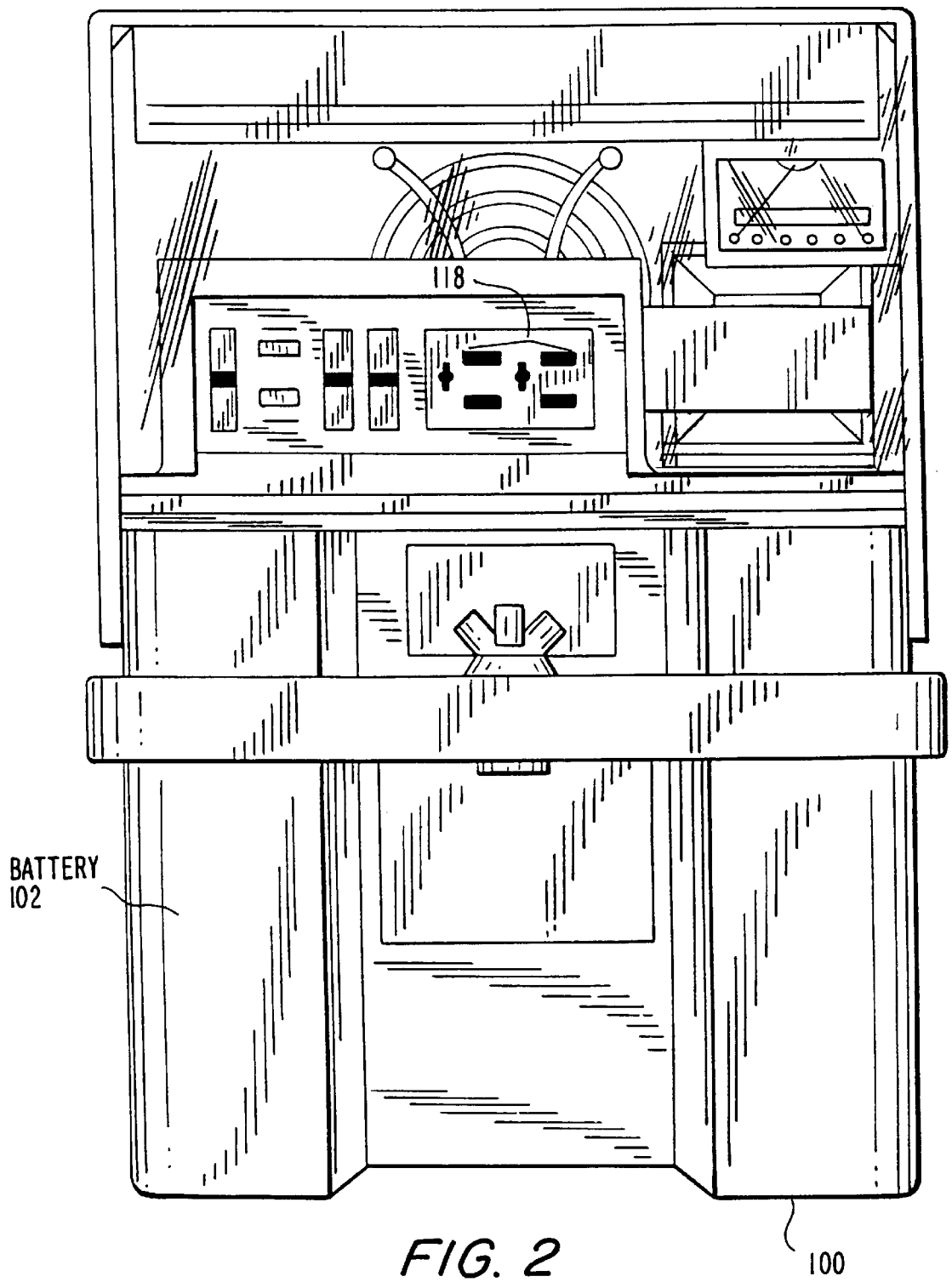
FIG. 2 is a front view of an embodiment according to the present invention.
Figure 3:
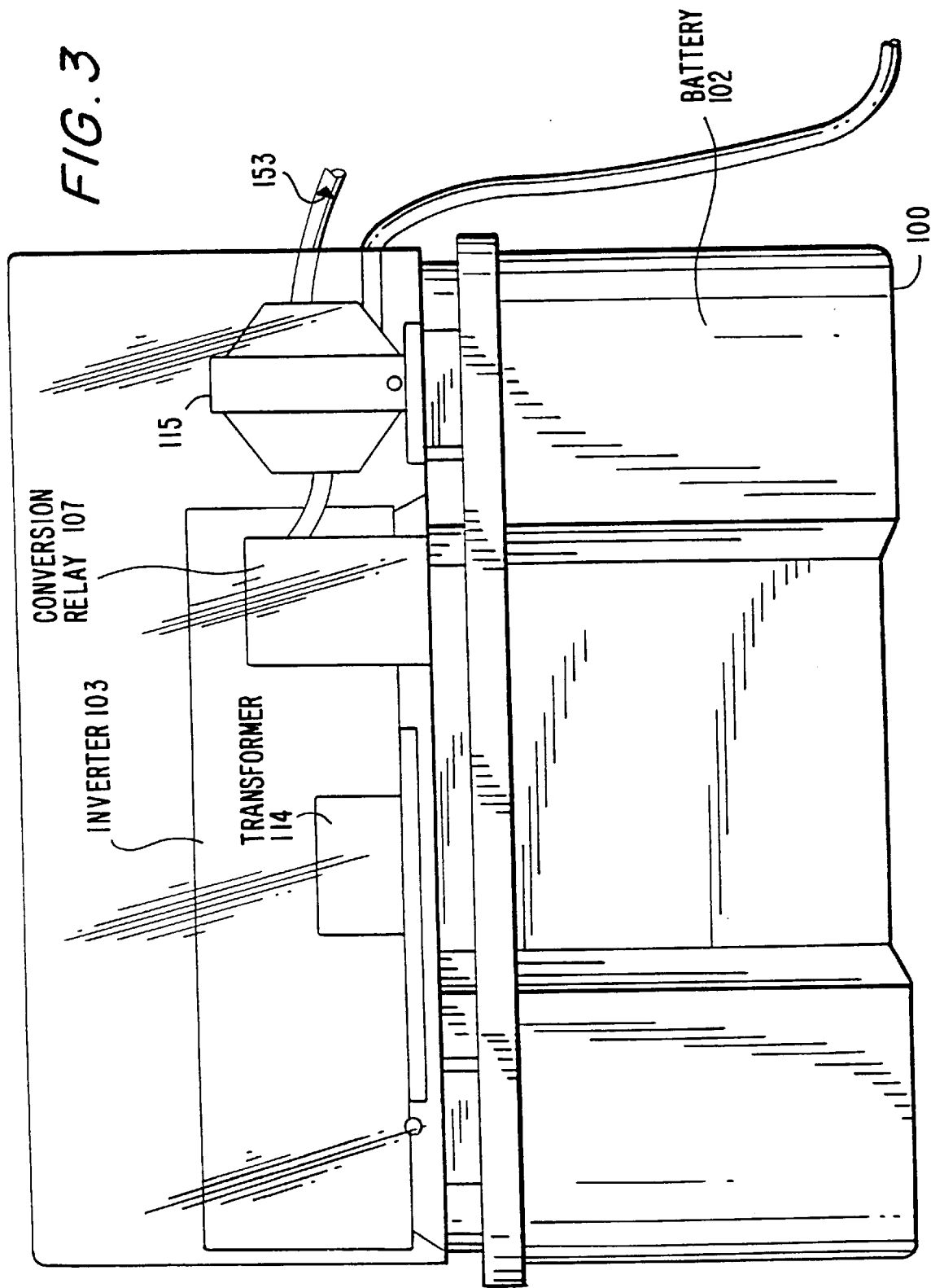
FIG. 3 is a side view of an embodiment according to the present invention.
Figure 4:
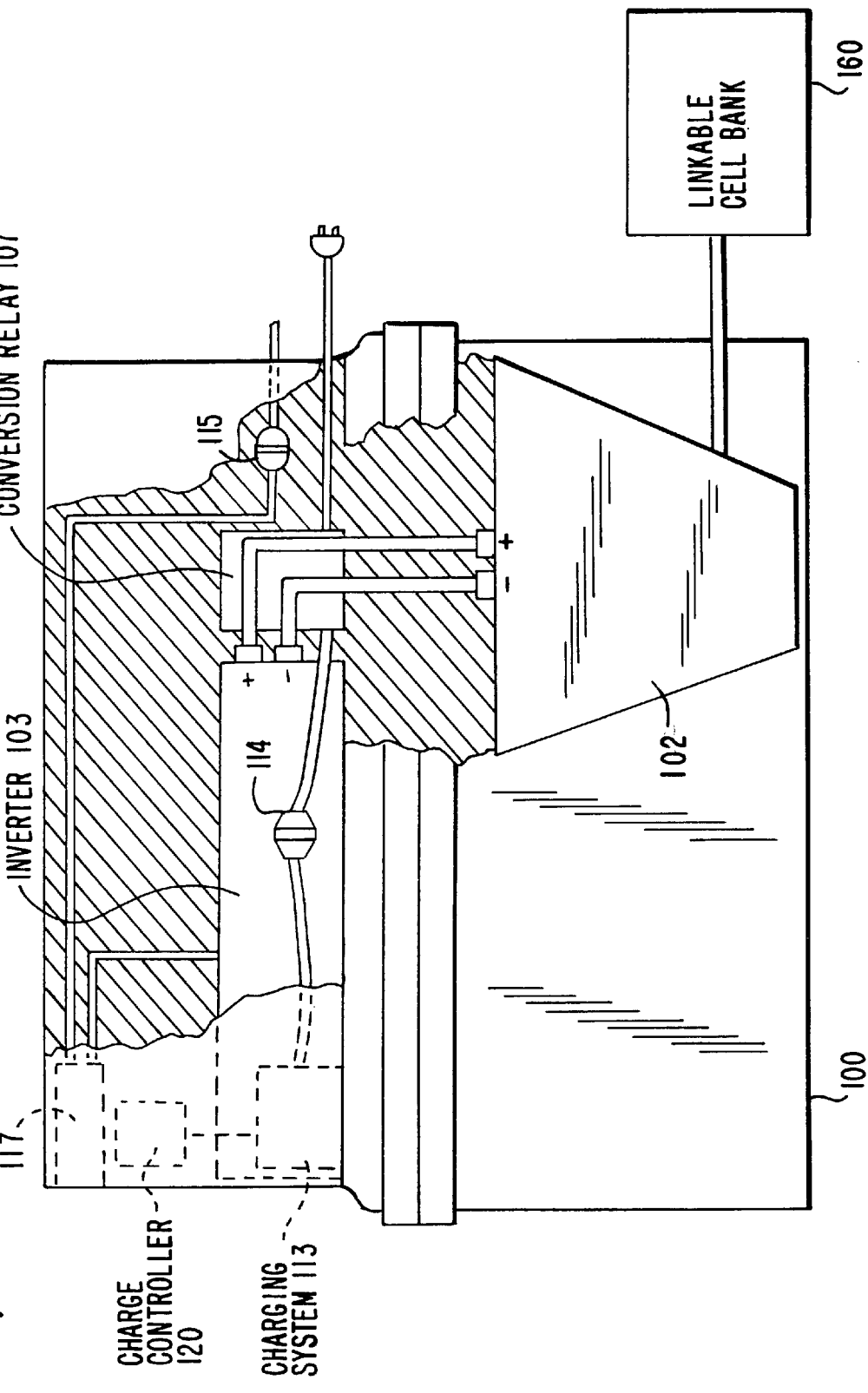
FIG. 4 is a cross-sectional side view of an embodiment according to the present invention.

Referring to FIGS. 1–4, the apparatus 100 plugs into a standard electrical outlet 101 which provides a source of electricity for the apparatus 100. The electricity may originate from a utility company or an on-site generator 180. The design of apparatus 100 may be that shown in U.S. Design Pat. No. 417,650.

The leads in the outlet 101 extend from first input terminals 108 included in the conversion relay 107. The conversion relay 107 also includes second input terminals 109, a pick coil 110, moveable terminals 111 and output terminals 112.

When power is supplied from the outlet 101, the pick coil 110 causes the moveable terminals 111 to contact the first input terminals 108 so that power travels from the first input terminals 108 through the moveable terminals 111 to the primary output terminals 106 of the inverter 103. From the primary output terminals 106, the power travels to the final output portion 117 and is distributed to any number of electrical devices through the AC receptacles 118. In an alternative embodiment, the apparatus 100 includes a line conditioner 116 so that the power flows through the line conditioner 116 before reaching the final output portion 117. The line conditioner 116 protects solid-state electronic equipment, such as computers, from damage by producing a clean filtered output of power. Additionally, the apparatus 100 may include a fan 170 positioned therein to control temperature of the apparatus 100.

The power supplied from the outlet 101 is also supplied to the transformer 114 via the conversion relay 107. The transformer 114 then provides the power to the charging system 113. The charging system 113 charges the battery 102 with DC power supplied through the input terminals 104 of the inverter 103. In an alternative embodiment, the battery 102 is charged when DC power from a wind turbine 130 and/or a solar array 131 is supplied to the battery 102 via respective charge controllers 120, 121 and the input terminals 104. The power received from the wind turbine 130 and/or the solar array 131 keeps the battery 102 charged in the event of a loss of power from the outlet 101.

In the event of a utility power failure, the apparatus uses power from the battery 102. The battery 102 is a 12 volt/200 AH cell and can be connected to a 12 volt/200 AHx2 linkable cell bank 160 to provide additional battery power. The linkable cell bank 160 is a collection of electrical energy storage and delivery units, such as batteries, which are used in conjunction with each other as a single device. Additionally, the battery 102 can function as charger for an electric device when it is directly connected via a power cord to the electric device.

When no power is supplied from the outlet 101, the pick coil 110 does not cause the moveable terminals 111 to contact the first input terminals 108. Instead, the moveable terminals 111 contact the second input terminals 109. As a result, the inverter 103 inverts DC power supplied from the battery 102 to AC power. The inverted AC power is then supplied to the AC receptacles 118 via secondary output terminals 105, secondary input terminals 109, moveable terminals 111, primary output terminals 106 and the final output portion 117. As described above, the line conditioner 116 may receive the power flow before the final output portion 117.

The apparatus 100 includes a subpanel 150 connected to a power converter 115, such as a twin power inversion unit, a triple power inversion unit, or a step-up transformer. The subpanel 150 can connect to the power converter 115 with a twist-lock mechanism 153. The twist-lock mechanism 153 allows for easy removal of the subpanel 150 from the apparatus 100 in the event of an emergency.

The subpanel 150 includes a plurality of switches 151. Each one of the switches corresponds to respective electrical devices plugged in at each of the AC receptacles 118. Some of the switches are set to an "on" position and some of the switches are set to an "off" position. Those electrical devices corresponding to the switches in the "on" position will automatically receive power from the battery 102 in the event of a utility power failure. In contrast, the electrical devices corresponding to the switches in the "off" position will not receive power from the battery 102 unless a user manually closes the switches. For example, the "on" position switches might control heat, a refrigerator and a sump pump, while the "off" position switches might control lighting and televisions.

The embodiments described above are illustrative of the invention, which is not limited to the embodiments described. Various changes and modifications may be made in the device by one skilled in the art without departing from the spirit or scope of the invention.

What is claimed is:

1. An apparatus for supplying alternating current power to electrical devices from an electric utility power supply and, when the utility power supply is unavailable, from a battery source, the apparatus comprising:

an inverter connected to the battery source at a direct current input portion of said inverter for changing direct current power to the alternating current power and for outputting the alternating current power at an output portion of said inverter;

a conversion relay connected to the utility power supply and the output portion of said inverter for supplying power from one of the inverter and the utility power supply to the electrical devices connected to a final output portion;

a charging system connected to the utility power supply via said conversion relay and to the battery source for charging the battery source with power from the utility power supply;

a subpanel consisting of a plurality of switches, whereby, when the utility power supply is unavailable, a first group of the subpanel switches is set for enabling automatic load pick up by the battery source and a second group of the subpanel switches is set for enabling manual load pick up by the battery source, wherein each one of the subpanel switches corresponds to an electrical device, a first position of a subpanel switch sets the corresponding electrical device for the automatic load pick up, and a second position of the subpanel switch sets the corresponding electrical device for the manual load pick up; and a power converter being connected to said subpanel.

2. The apparatus according to claim 1, further comprising at least one charge controller connected to said charging system and to a power generating device for charging the battery source with power supplied from the power generating device.

3. The apparatus according to claim 2, wherein the power generating device is a wind turbine.

4. The apparatus according to claim 2, wherein the power generating device is a solar array.

5. The apparatus according to claim 1, wherein the battery source is connected to a linkable cell bank.

6. The apparatus according to claim 1, further comprising a line conditioner connected to said step-up transformer and between said inverter and the final output portion.

7. The apparatus according to claim 1, wherein the final output portion includes a plurality of AC receptacles.

8. The apparatus according to claim 1, further comprising a fan for controlling temperature of the apparatus.

9. The apparatus according to claim 1, wherein the utility power supply is an on-site generator.

10. The apparatus according to claim 1, wherein the power converter is connected to said subpanel with a twist-lock mechanism.

11. The apparatus according to claim 1, wherein the power converter is a step-up transformer for increasing input voltage from 110 volts to 220 volts to accommodate the electric devices with higher voltage requirements, a twin power inversion unit, or a triple power inversion unit.

12. A method for supplying alternating current power to electrical devices from an electric utility power supply and, when the utility power supply is unavailable, from a battery source, comprising the steps of:

connecting an inverter to the battery source at a direct current input portion of the inverter;

changing direct current power to the alternating current power;

outputting the alternating current power at an output portion of the inverter;

connecting a conversion relay to the utility power supply and to the output portion of the inverter;

supplying power from one of the inverter and the utility power supply to the electrical devices connected to a final output portion;

connecting a charging system to the utility power supply via the conversion relay and to the battery source;

charging the battery source with power from the utility power supply;

connecting a power converter to a subpanel having a plurality of switches;

assigning each one of the switches to an electrical device;

setting a first group of the switches to a first position for causing automatic load pick up by the battery source when the utility power supply is unavailable; and setting a second group of the switches to a second position for causing manual load pick up by the battery source when the utility power supply is unavailable.

13. The method according to claim 12, further comprising the steps of:

connecting at least one charge controller to the charging system and to a power generating device;

charging the battery source with power supplied from the power generating device.

14. The method according to claim 13, wherein the power generating device is a wind turbine.

15. The method according to claim 13, wherein the power generating device is a solar array.

16. The method according to claim 12, further comprising the step of connecting the battery source to a linkable cell bank.

17. The method according to claim 12, further comprising the step of connecting a line conditioner to the power converter and between the inverter and the final output portion.

18. The method according to claim 12, further comprising the step of controlling temperature with a fan.

19. The method according to claim 12, wherein the power converter is a step-up transformer for increasing input voltage from 110 volts to 220 volts to accommodate the electric devices with higher voltage requirements, a twin power inversion unit, or a triple power inversion unit.

* * * * *